(No Model.)  6 Sheets—Sheet 1.
W. O. TYERS.
MACHINERY FOR MAKING ROLLED WIRE NAILS.

No. 457,237. Patented Aug. 4, 1891.

Witnesses:—
Richard Sherrett
Arthur J. Powell

Inventor:—
William Osborn Tyers (No Model.) 6 Sheets—Sheet 2.

W. O. TYERS.
MACHINERY FOR MAKING ROLLED WIRE NAILS.

No. 457,237. Patented Aug. 4, 1891.

Witnesses;
Richard Skerrett
Arthur J. Powell

Inventor;
William Osborn Tyers (No Model.) 6 Sheets—Sheet 3.
W. O. TYERS.
MACHINERY FOR MAKING ROLLED WIRE NAILS.
No. 457,237. Patented Aug. 4, 1891.

Witnesses:—
Richard Skerrett
Arthur J. Powell

Inventor:—
William Osborn Tyers (No Model.) 6 Sheets—Sheet 4.
W. O. TYERS.
MACHINERY FOR MAKING ROLLED WIRE NAILS.
No. 457,237. Patented Aug. 4, 1891.

Witnesses;—
Richard Skerrett
Arthur J. Powell

Inventor;—
William Osborn Tyers (No Model.) 6 Sheets—Sheet 5.

W. O. TYERS.
MACHINERY FOR MAKING ROLLED WIRE NAILS.

No. 457,237. Patented Aug. 4, 1891.

Witnesses:—
Richard Skerrett
Arthur J. Powell

Inventor:—
William Osborn Tyers

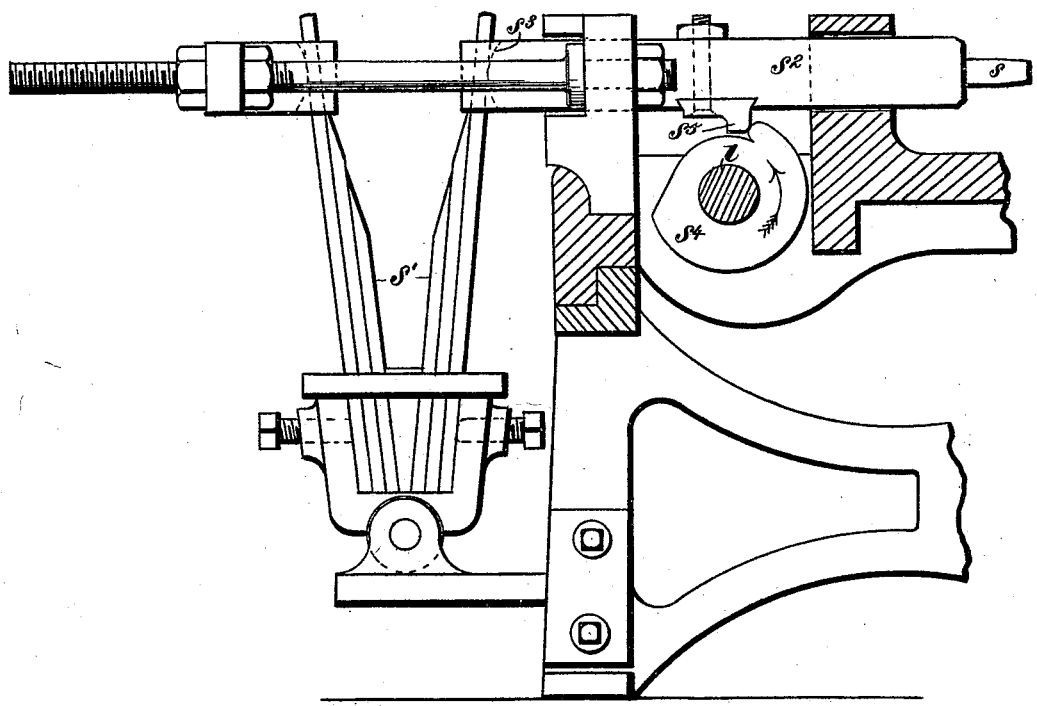

UNITED STATES PATENT OFFICE.

WILLIAM OSBORN TYERS, OF SMETHWICK, ASSIGNOR TO THE NETTLEFOLDS, LIMITED, OF BIRMINGHAM, ENGLAND.

MACHINERY FOR MAKING ROLLED-WIRE NAILS.

SPECIFICATION forming part of Letters Patent No. 457,237, dated August 4, 1891.

Application filed May 27, 1890. Serial No. 353,373. (No model.)

*To all whom it may concern:*

Be it known that I, WILLIAM OSBORN TYERS, machinist, a subject of the Queen of Great Britain, and a resident of No. 130 Windmill Lane, Smethwick, in the county of Stafford, England, have invented certain new and useful Improvements in Machinery for Making Rolled-Wire Nails, of which the following is a specification.

This invention relates to machinery for the manufacture of wire nails; and it consists in the construction and combination of parts, as hereinafter described and claimed, reference being had to the accompanying drawings, in which—

Figures 1, 2, and 3 represent nails, the bodies of which are provided with cross or rib-like projections. Figs. 4 and 5 represent plain nails made by the rolls and machinery hereinafter described. Figs. 6, 7, 8, 9, 10, 11, 12, 13, 14, and 15 represent the rolls which I use in the nail-making machine, and Figs. 16, 17, 18, 19, and 20 represent the nail-making machine containing my improvements.

The wire nail represented in Fig. 1 has a triangular-shaped body, all the sides of said body being provided with cross or rib like inclined projections *a a*, as represented, for giving the nail a better hold on the wood in which it is driven. The shaping of the body of the nail from cylindrical wire is effected by the use of the pair of feeding-rolls represented in Figs. 6 and 7 used in the nail-making machine. The roll Fig. 6 is a cylindrical roll, and the other roll (represented in Fig. 7) has a groove in it situated at right angles to the axis of the roll, the two sides of the groove making with each other an angle equal to the angles made by two adjacent sides of an equilateral triangle. Depressions are made in the acting parts of the two rolls, the said depressions having a configuration the counterpart of the rib-like projections *a a* to be formed on the sides of the triangular body of the nail, Fig. 1. When the acting parts of the rolls are brought together, a groove having the triangular figure of the body of the nail and the ribs to be produced on its sides is formed.

The wire nail represented in Fig. 2 has a body square in cross-section, and is provided with inclined rib-like projections *a a* of the kind described and represented with respect to the nail, Fig. 1, having a triangular form in cross-section.

Figs. 8 and 9 represent the feeding-rolls by which the nail, Fig. 2, is fashioned from the cylindrical wire fed to the nail-making machine.

The wire nail represented in Fig. 3 has a triangular form in cross-section, and is provided with cross or rib-like projections *a a* on all of its sides, the said projections being situated at right angles to the axis of the nail instead of inclined thereto, as in the nails, Figs. 1 and 2.

Figs. 10 and 11 represent the pair of feeding-rolls for producing the body of the nail, Fig. 3, from the cylindrical wire fed to the nail-making machine.

Although I have shown the square and triangular wire nails having cross or rib-like projections on all their sides, yet the projections may be confined to one or two only of their sides, in which case the depressions in the rolls have a corresponding figure, and although I have only represented nails having a triangular and square form in cross-section and provided with two kinds of rib-like projections, yet by varying the configuration of the acting parts of the feeding-rolls the sectional figure of the body of the nails and the form of the rib-like projections thereon may be modified, as desired; but I have found the sectional forms of the body of the nails and the kinds of projections shown to answer well in practice.

The plain-bodied wire nail, Fig. 4, has a triangular figure in cross-section, the body of the nail being produced from cylindrical wire by the action of the pair of feeding-rolls represented in Figs. 12 and 13 used in the nail-making machine.

The rolls, Figs. 12 and 13, resemble those represented in Figs. 6 and 7, excepting that their acting parts are without depressions.

The plain-bodied wire nail, Fig. 5, is square in cross-section, and is produced from cylindrical wire by the action of the pair of feeding-rolls represented in Figs. 14 and 15 used in the nail-making machine. Each of the rolls, Figs. 14 and 15, has a groove in its periphery, the two sides of the groove being at right angles to one another.

Fig. 20 represents a sectional view of a part of the machine exhibiting the mechanism for operating the nail-heading tool.

Figure 1:
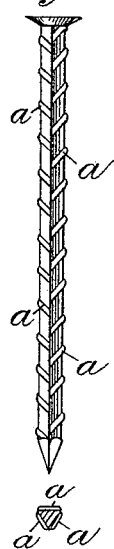
Figure 2:
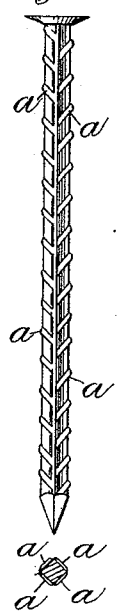
Figure 3:
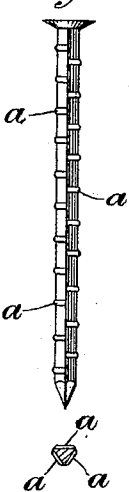
Figure 12:
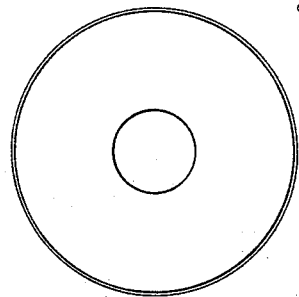
Figure 4:
Figure 13:
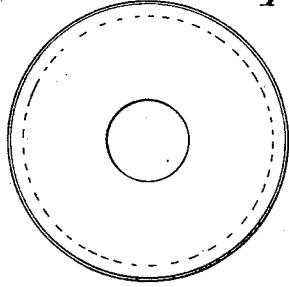
Figure 13:
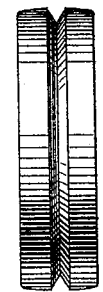
Figure 14:
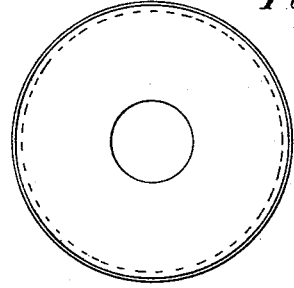
Figure 5:
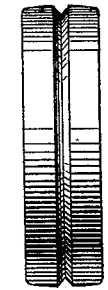
Figure 15:
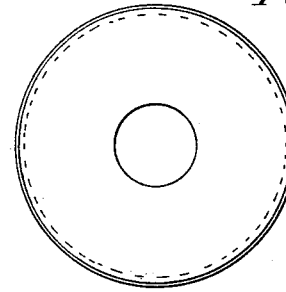
Figure 15:
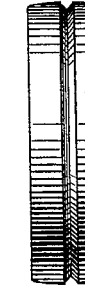
Figure 6:
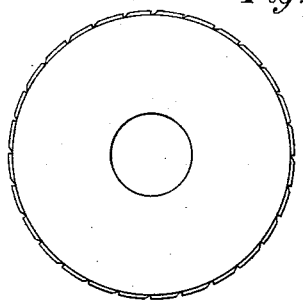
Figure 8:
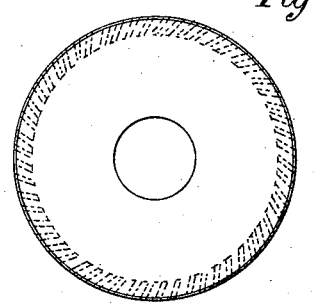
Figure 7:
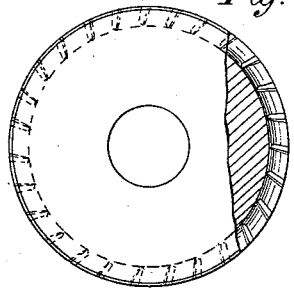
Figure 9:
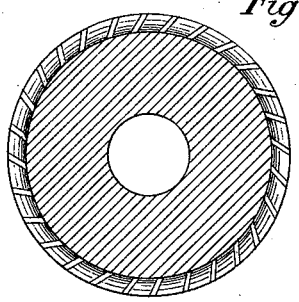
Figure 10:
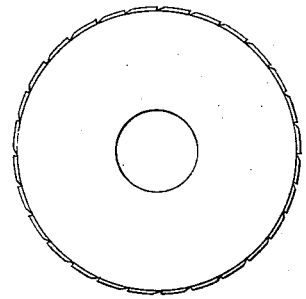
Figure 10:
Figure 11:
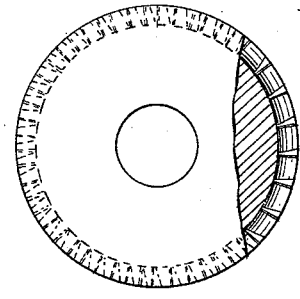
Figure 11:
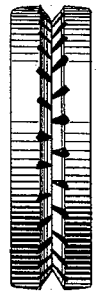
Figure 16:
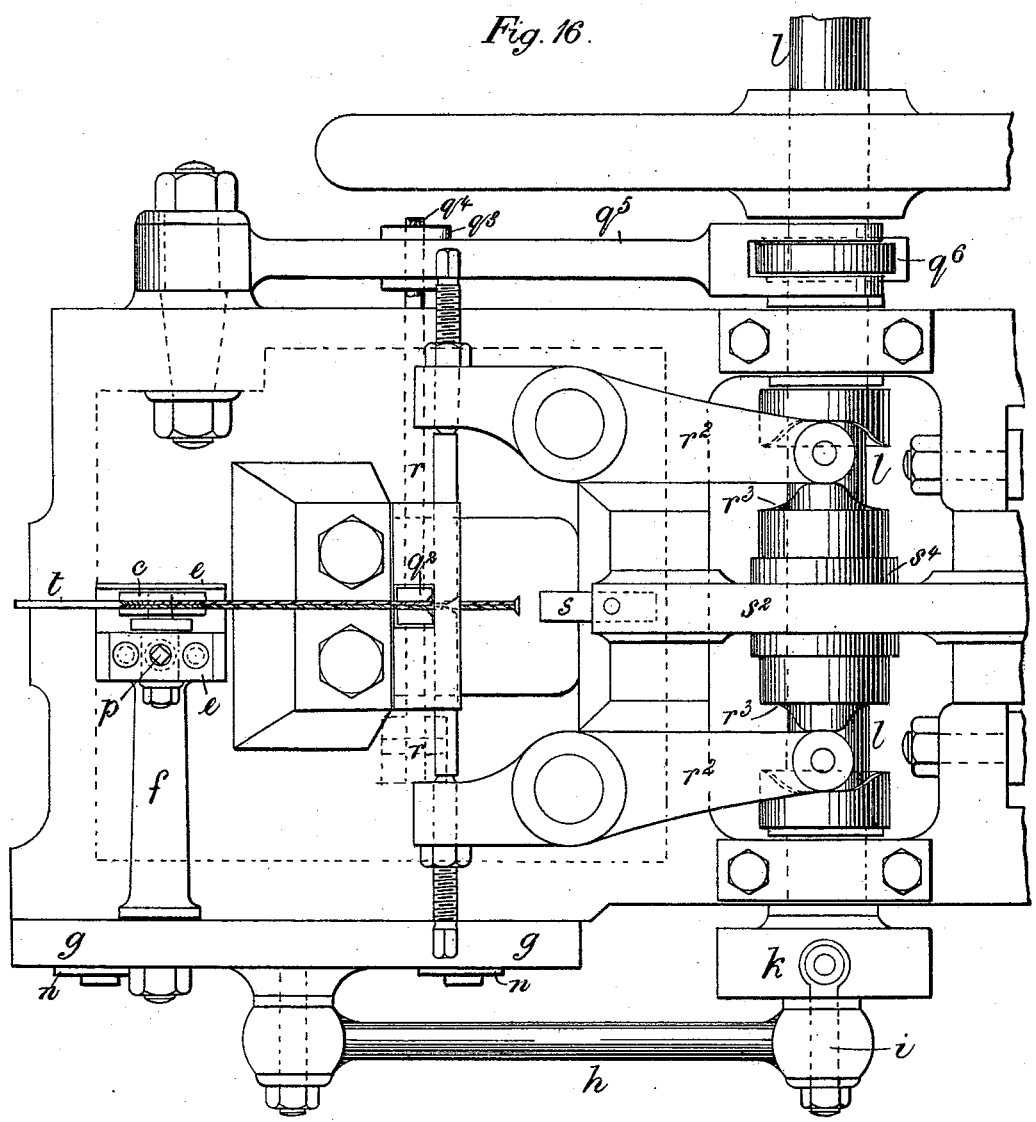
Fig. 16 represents in plan, and Fig. 17 in side elevation, a portion of a nail-making machine with which is combined feeding-rolls constituting part of my invention for shaping the cylindrical wire fed into the machine into the sectional figure required to produce wire nails of the kinds hereinbefore described and illustrated and of analogous kinds.
Figure 17:
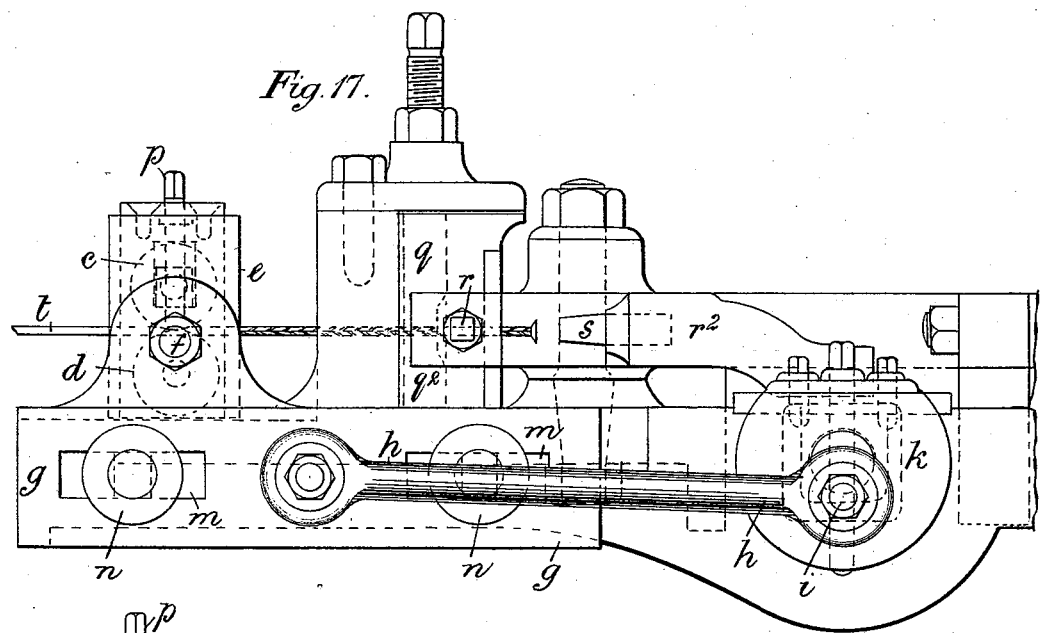
Figure 18:
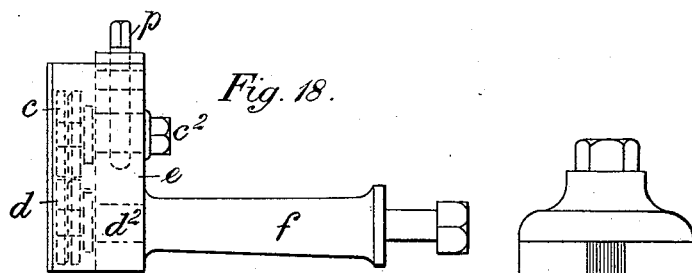
Fig. 18 represents the feeding-rolls and the parts carrying them detached from the machine.
Figure 19:
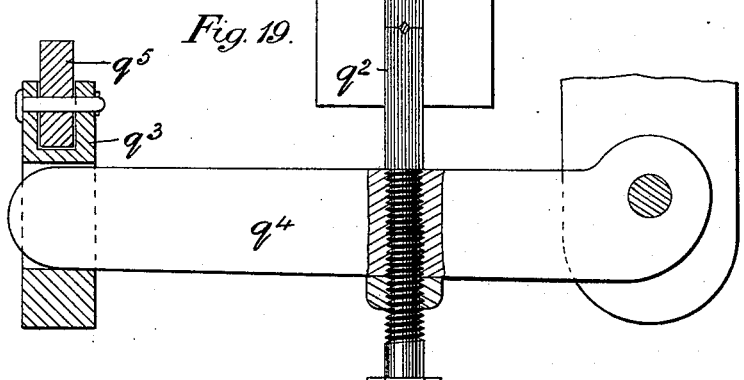
Fig. 19 represents a cross-section of the machine exhibiting the gripping-tools.

The same letters of reference indicate the same parts in Figs. 16, 17, 18, 19, and 20.

The pair of feeding-rolls, which also act as shaping-rolls, are marked $c$ and $d$, and are carried by the upright $e$ on the cross-arm $f$, the latter being bolted to the slide $g$, to which a reciprocating sliding motion is given by the connecting-rod $h$, receiving motion from a crank-pin $i$ on the face or crank plate $k$ on the driving-shaft $l$ of the machine, the said crank-pin $i$ being adjustable on the said face or crank plate for regulating the length of the stroke of the said connecting-rod $h$ and the slide $g$ of the feeding-rolls $c$ $d$. The reciprocating slide $g$ is guided in its motion by the pins and slots at $m$ $m$, (see Fig. 17,) and is retained in its place by the retaining disks or plates $n$ $n$. The feeding-rolls $c$ $d$ are of the kinds I have hereinbefore described, either for shaping only the cylindrical wire fed to the machine or for shaping the wire and for producing cross or rib-like projections on one or more of the sides of the wire. The said rolls are carried by the axes or spindles $c^2$ $d^2$, (see Fig. 18,) on which they are capable of rotating. By means of the screw $p$ the bearing in which the axis of the upper roll turns can be adjusted nearer to or farther from the axis of the lower roll. By driving home the screw $p$ the acting parts of the two rolls can be forcibly pressed upon and made to grip the cylindrical wire fed into the machine. A length of the cylindrical wire sufficient to form a nail is fed by the feeding-rolls $c$ $d$ to the working-tools of the machine at each advance stroke of the slide $g$, each return stroke of the said slide causing the rolls to rotate upon the gripped cylindrical wire and shape it or shape the wire and produce the required rib-like projections on one or more of its sides. The cylindrical wire is fed between two gripping-tools $q$ $q^2$, as usual, (see Fig. 19,) the movable gripping-tool $q^2$ being worked by a loose shackle motion consisting of the arm $q^3$ and lever $q^4$, the said arm $q^3$ being actuated from the connecting-rod $q^5$, worked from the cam $q^3$ on the main shaft. (See Figs. 16 and 19.)

$r$ $r$ are the cutting-off and pointing tools operated by the levers $r^2$ $r^2$ and cams $r^3$ $r^3$. (See Fig. 16.)

$s$ is the heading-tool, as seen in Fig. 20, the said heading-tool being carried by the slide $s^2$, the advance motion of which is effected by a strong bow-spring S', bearing upon the end $s^3$ of the slide $s^2$, and the back motion by the action of the cam $s^4$ on the shaft $l$, the rise of the said cam $s^4$ bearing against the projection $s^5$ on the slide $s^2$. As soon as the cut-away part of the cam $s^4$ is brought opposite the projection $s^5$ the slide $s^2$ is released and is advanced for the heading operation by the bow-spring S', bearing against the outer end of the said slide $s^2$ at $s^3$.

As the gripping, cutting-off, and pointing and heading tools constitute no part of this invention, I do not consider a further description of the same necessary.

The action of the machine is as follows: The cylindrical wire $t$, being fed between the feeding-rolls, the said feeding-rolls are adjusted by the screw $p$, so as to cause them forcibly to grip the wire. By the advance stroke of the slide $g$ the rolls $c$ $d$ are moved forward without rotation, carrying with them the gripped wire, a length of wire sufficient to form a nail being thus fed into the machine. The wire being gripped by the grippers at $q$ $q^2$, the heading of the inner end of the wire is effected by the heading-tool $s$, and then, by the operation of the cutters $r$ $r$, a nail is cut off from the wire. While the wire is gripped by the gripping-tools at $q$ $q^2$ the slide $g$ makes the return stroke. The rolls $c$ $d$ are thereby caused to rotate by the stationary wire gripped between them, and in their rotation they shape and fashion a length of the cylindrical wire sufficient to form a nail into the sectional figure which it is desired the body of the nail shall have, as hereinbefore described.

Having now particularly described and ascertained the nature of my invention and the manner in which the same is to be performed, I declare that I claim as the said invention of improvements in wire nails and in machinery for the manufacture of wire nails—

In a machine for making rolled-wire nails having a series of rib-like projections throughout the length of the nail, the combination, with the heading and pointing tools, of a pair of slidable feeding and shaping rolls, one or both grooved circumferentially to change the shape of the wire in cross-section and having their acting faces provided with series of depressions corresponding with the series of ribs or projections to be formed on the nails, substantially as shown and described.

WILLIAM OSBORN TYERS.

Witnesses:
GEORGE SHAW,
RICHARD SKERRETT.